United States Patent
Lee (10) Patent No.: US 7,738,068 B2
(45) Date of Patent: Jun. 15, 2010

(54) LIQUID CRYSTAL DISPLAY DEVICE

(75) Inventor: Tae-Rim Lee, Gyeonggi-Do (KR)

(73) Assignee: LG. Display Co., Ltd., Seoul (KR)

( * ) Notice: Subject to any disclaimer, the term of this patent is extended or adjusted under 35 U.S.C. 154(b) by 1021 days.

(21) Appl. No.: 11/477,266

(22) Filed: Jun. 29, 2006

(65) Prior Publication Data

US 2007/0153215 A1    Jul. 5, 2007

(30) Foreign Application Priority Data

Dec. 30, 2005    (KR) ............... 10-2005-0136115
May 15, 2006    (KR) ............... 10-2006-0043314

(51) Int. Cl.
*G02F 1/1339*    (2006.01)

(52) U.S. Cl. ..................... 349/156; 349/155

(58) Field of Classification Search ......... 349/155–157
See application file for complete search history.

(56) References Cited

U.S. PATENT DOCUMENTS 7,375,788 B2 *    5/2008    Chiang et al. ............... 349/155

FOREIGN PATENT DOCUMENTS

CN    1661425    8/2005
CN    1696776    11/2005

OTHER PUBLICATIONS

Office Action issued in corresponding Chinese Patent Application No. 200610095971.4; issued Jul. 4, 2008.

* cited by examiner

*Primary Examiner*—Kevin S Wood
(74) *Attorney, Agent, or Firm*—Brinks Hofer Gilson & Lione

(57) ABSTRACT

A liquid crystal display device minimizing touch inferiority and a press inferiority defects is provided. The device includes first and second substrates, a liquid crystal layer interposed therebetween, gap spacers between the first and second substrates for maintaining a cell gap, and pressure spacers between the first and second substrates configured to contact the first and second substrates when pressure is applied to the first or second substrate, wherein a spatial density of the gap spacers or a spatial density of the pressure spacers varies at different positions across the first and second substrates.

41 Claims, 7 Drawing Sheets

FIG. 7C ns filed on May 15, 2006, herein incorporated by reference.

LIQUID CRYSTAL DISPLAY DEVICE

PRIORITY CLAIM

This application claims the benefit of priority to Korean Patent Applications No. 136115/2005, filed on Dec. 30, 2005 and No. 43314/2006, filed on May 15, 2006, herein incorporated by reference.

TECHNICAL FIELD

The present invention relates to a liquid crystal display (LCD) device, more particularly, to an LCD device which is capable of preventing a touch inferiority and a press inferiority by adjusting a density of both gap spacer and pressure spacer according to a position of an LCD panel.

BACKGROUND

In view of their compact construction, light weight, and low power-consumption, flat panel display devices are being widely developed. Flat panel displays include liquid crystal displays (LCDs), plasma display panels (PDPs), field emission displays (FEDs), and vacuum fluorescent displays (VFDs). Owing to the ease with which they are driven, and to their superior ability to display images, LCDs are becoming increasingly popular.

Figure 1:
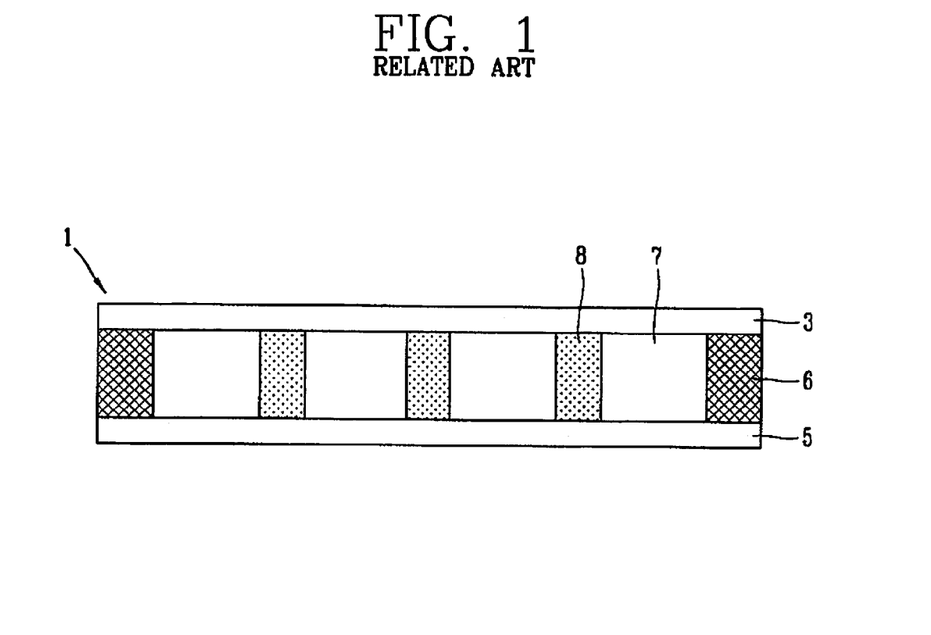
FIG. 1 is a sectional view schematically illustrating an LCD panel.

FIG. 1 is a schematic diagram illustrating a section of a typical LCD panel. As illustrated in FIG. 1, an LCD panel 1 generally comprises a lower substrate 5, an upper substrate 3 and a liquid crystal layer 7 disposed therebetween. The lower substrate 5 (also known as the driving device array substrate) includes a plurality of pixels (not shown), in which each pixel includes a driving device or thin film transistor (TFT). The upper substrate 3, also known as the color filter substrate, includes a color filter layer to provide color. The lower and upper substrates 5 and 3 further include pixel electrodes and common electrodes, respectively. An alignment layer is formed on the lower and upper substrates 5 and 3 to align liquid crystal molecules from the liquid crystal layer 7.

The lower substrate 5 and the upper substrate 3 are bonded to one another by a sealant 6 at peripheral regions thereof. A spacer 8 is interposed between the lower and upper substrates 5 and 3 to maintain a constant cell-gap therebetween. Images are displayed as the driving devices in the lower substrate 5 control light transmittance through the liquid crystal layer 7 via the liquid crystal molecules disposed between the lower and upper substrates 5 and 3.

An LCD panel may be fabricated using a driving device array substrate forming process to form driving devices in the lower substrate 5 and a color filter substrate forming process to form the color filter in the upper substrate 3. A spacer and sealant forming process may be employed to complete the fabrication process.

The driving device array substrate forming process typically includes forming a plurality of gate and data lines arranged on the lower substrate 5 to define pixel regions, forming thin film transistors (TFTs) (i.e., the driving devices) in each pixel region with each TFT being connected to a gate and data line, and forming pixel electrodes for driving the liquid crystal layer 7 when signals are applied through the TFTs. The color filter substrate forming process includes forming a black matrix on the upper substrate 3, forming a color filter on the formed black matrix, and forming a common electrode.

The spacer 8 can be a column spacer or a ball spacer. It is difficult to evenly distribute ball spacers on a substrate and maintain a uniform cell gap without reducing the aperture ratio in an LCD panel. Column spacers may be better suited for maintaining a constant cell gap and for preserving the aperture ratio, since they can be formed at predetermined positions throughout the LCD panel.

However, column spacers have their own share of problems. First, they may be unable to prevent a touch inferiority defect at the surface of the LCD device. For example, when a surface portion of an LCD device is swept away, non-uniform brightness at the swept portion may generate a stain. Secondly, a press inferiority defect may occur when the surface of an LCD device is pressed under constant strength. In this case, the color filter substrate or the TFT substrate may be altered so that a corresponding stain is generated.

SUMMARY

In an embodiment, a liquid crystal display device includes first and second substrates and a liquid crystal layer between the first and second substrates. Column spacers reside between the first and second substrates to maintain a cell gap and protrusions contact corresponding column spacers where the spatial density of the protrusions varies at different positions across the first or second substrates.

In another embodiment, a liquid crystal display device includes first column spacers contacting the first and second substrates and second column spacers on one of the first and second substrates and spaced apart from the other of the first and second substrates. The spatial density of the first column spacers varies across the first and second substrates, such that the spatial density in a center portion is less than an outer periphery portion.

In yet another embodiment, a liquid crystal display device includes a plurality of pixels. First column spacers contact first and second substrates and second column spacers reside on one of the first and second substrates and are spaced apart from the other of the first and second substrates. The number of the first column spacers in the plurality of pixels varies across the first and second substrates, such that the number of first column spacers in the pixels in a center portion of the display is less than the number of first column spacers in the pixels in a periphery portion.

In still another embodiment, a liquid crystal display device includes first column spacers contacting first and second substrates. A plurality of pixels include gate lines and data lines. Second column spacers reside on one of the first and second substrates and are spaced apart from the other of the first and second substrates. The number of second column spacers between the first column spacers increases along the data and gate lines from a peripheral portion of the display toward a center portion of the display.

In a further embodiment, a liquid crystal display device includes first and second substrates and a liquid crystal layer between the first and second substrates. Column spacers reside between the first and second substrates to maintain a cell gap. Protrusions contact corresponding column spacers and the distance between the protrusions increases in a direction from a periphery of the display toward a center of the first or second substrates.

In a still further embodiment, a method for making a liquid crystal display device includes forming first and second substrates and forming column spacers between the first and second substrates to maintain a cell gap. Protrusions are formed contacting corresponding column spacers, where a spatial density of the protrusions varies at different positions across the first or second substrates. A liquid crystal layer is disposed between the first and second substrates.

DETAILED DESCRIPTION

Touch inferiority may be generated on an LCD device due to contact between column spacers and substrates during touching. That is, contact between a column spacer and a substrate may generate a frictional force therebetween. If the substrate is negatively impacted by these frictional forces, the liquid crystal molecules may not recover their original state and a stain may be generated in the touched portion. The touch inferiority can be minimized or prevented by reducing the number of column spacers in contact with the substrates.

Press inferiority may be generated when pressure is applied to the substrates so as to produce changes in the color filter substrate and/or the thin film transistor (TFT) substrate. Press inferiority can be minimized or prevented by maximizing the number of column spacers so that when the pressure is applied, changes to the color filter substrate and/or the TFT substrate are prevented.

Touch inferiority and press inferiority operate by opposing principles. When the spatial density of column spacers is increased, the contact areas between the column spacers and substrates is increased, thereby resulting in increased touch inferiority. However, as the application of pressure to the substrates increases, press inferiority is reduced. On the other hand, when the spatial density of column spacers is reduced, the contact areas between the column spacers and substrates is decreased, thereby resulting in reduced touch inferiority. However, as the application of pressure to the substrates increases, the substrates may be altered, increasing press inferiority.

In view of the contrary principles underlying touch inferiority and press inferiority, it is difficult to simultaneously reduce or prevent both phenomena. In other words, one cannot simply adjust the number of column spacers or their spatial density to simultaneously reduce both touch inferiority and press inferiority.

The present invention provides column spacers to minimize touch inferiority and press inferiority. The column spacers are illustrated in FIG. 2.

Figure 2:
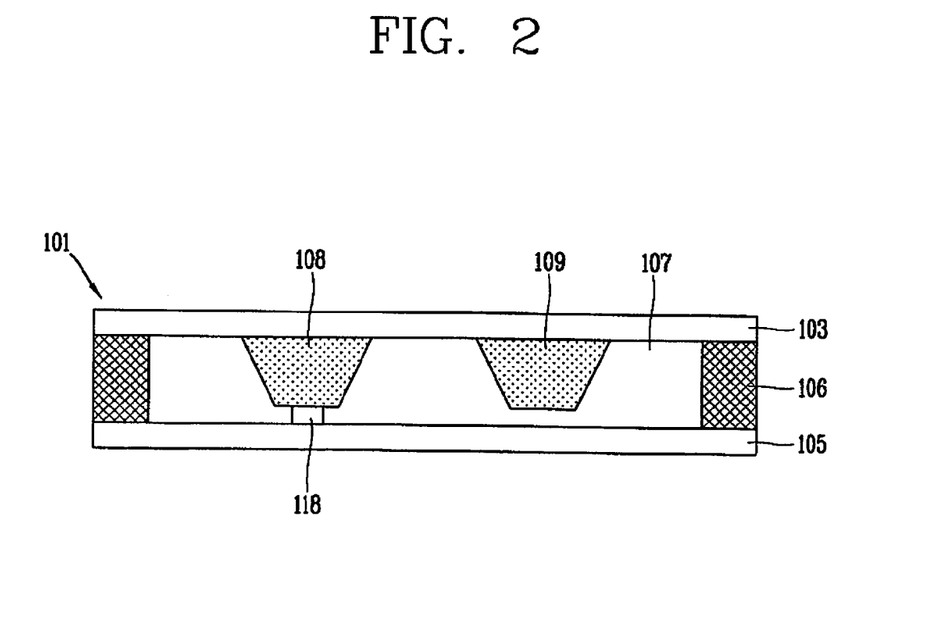
FIG. 2 is a sectional view illustrating an LCD panel according to one aspect of the disclosure.

As shown in FIG. 2, a sealant 106 is used to bond a lower substrate 105 with driving device arrays such as TFTs to an upper substrate 103 having a color filter. A liquid crystal layer 107 is interposed between the lower and upper substrate 105 and 103. On the upper substrate 103, a plurality of first column spacers 108 and second column spacers 109 are formed. At this time, the first column spacers 108 and the second column spacers 109 are spaced from the lower substrate 105 in a predetermined distance. On the lower substrate 105, a plurality of protrusions 118 are formed at the corresponding region to the first column spacers 108. As shown in FIG. 2, the first column spacers are contacted with the protrusions 118, but the second column spacers 109 are separated from the lower substrate 105.

The first column spacers 108 are contacted with the protrusions on the lower substrate 105 to maintain a constant cell gap between the upper and second substrates 103 and 105. Thus, the combination of the first column spacers 108 the protrusion 118 function as a gap spacer to maintain the constant cell gap.

Since the second column spacers 109 are spaced from the lower substrate 105 at a predetermined distance, the second column spacers 109 are not in contact with the lower substrate 105. When the upper substrate 103 and the lower substrates 105 are pressed, however, the second column spacers 109 are brought in contact with the lower substrate 105 so that the distortion of the upper substrate 103 and the lower substrate 105 is prevented. Thus, the second column spacer 109 function as pressure spacers.

The first column spacers 108 and the second column spacers 109 are formed on the upper substrate 103 by the same material such as an organic material in the same process, and the protrusions 118 are formed on the lower substrate 105 by a different process from that of the column spacers 108 and 109. That is, the first and second column spacers 108 and 109 have substantially same structure. Thus, both first and second column spacer 108 and 109 are arranged in the same spatial configuration as conventional the column spacers.

In accordance with an embodiment of the invention, only the first column spacers 108 contact the protrusions 118, such that the first column spacers 108 maintain the cell gap of the liquid crystal display panel 101. Since the number of the protrusions 118 is smaller than the total number of the first and second column spacers 108 and 109, however, the number of the gap spacers (that is, the combination of the first column spacers 108 and the protrusions 118) to maintain the cell gap is smaller than the number of the prior art gap spacers (that is, the conventional column spacers of the prior art). Therefore, the number of the column spacers in contact with the lower substrate is decreased compared with the prior art column spacers, so that the contact area between the column spacers and the lower substrate is decrease.

Further, as shown in FIG. 2, since the section area of the protrusions 118 is smaller than that of the first column spacers 108, the contact area between the column spacers and the lower substrate 105 is further decreased compared with the contact area of prior art column spacers. In the liquid crystal panel of this invention, accordingly, the touch inferiority may be effectively prevented.

Further, since the second column spacers 109 are then brought in contacted with the lower substrate 105 and function as pressure spacers when the first and second substrates 103 and 105 are pressed, the press inferiority caused by the pressure may be effectively prevented.

When pressure is not applied to the upper substrate 103 and the lower substrate 105, in accordance with the illustrated embodiment only the first column spacers 108 are in contact with the protrusions 118 to maintain the cell gap of the liquid crystal display panel 101. Comparing with the prior art, thus, the number of the column spacers in contact with the lower substrate is decreased so that the touch inferiority may be prevented. Further, when pressure is applied to the upper substrate 103 and the lower substrate 105, the first column spacers 108 are also in contact with the protrusions 118 and the second column spacers 109 are also in contact with the lower substrate 105, so that press inferiority may be prevented. In other word, since all column spacers 108 and 109 are in contact with the lower substrate 105 when pressure is graded to the upper and lower substrate the press inferiority may be prevented.

Figure 3:
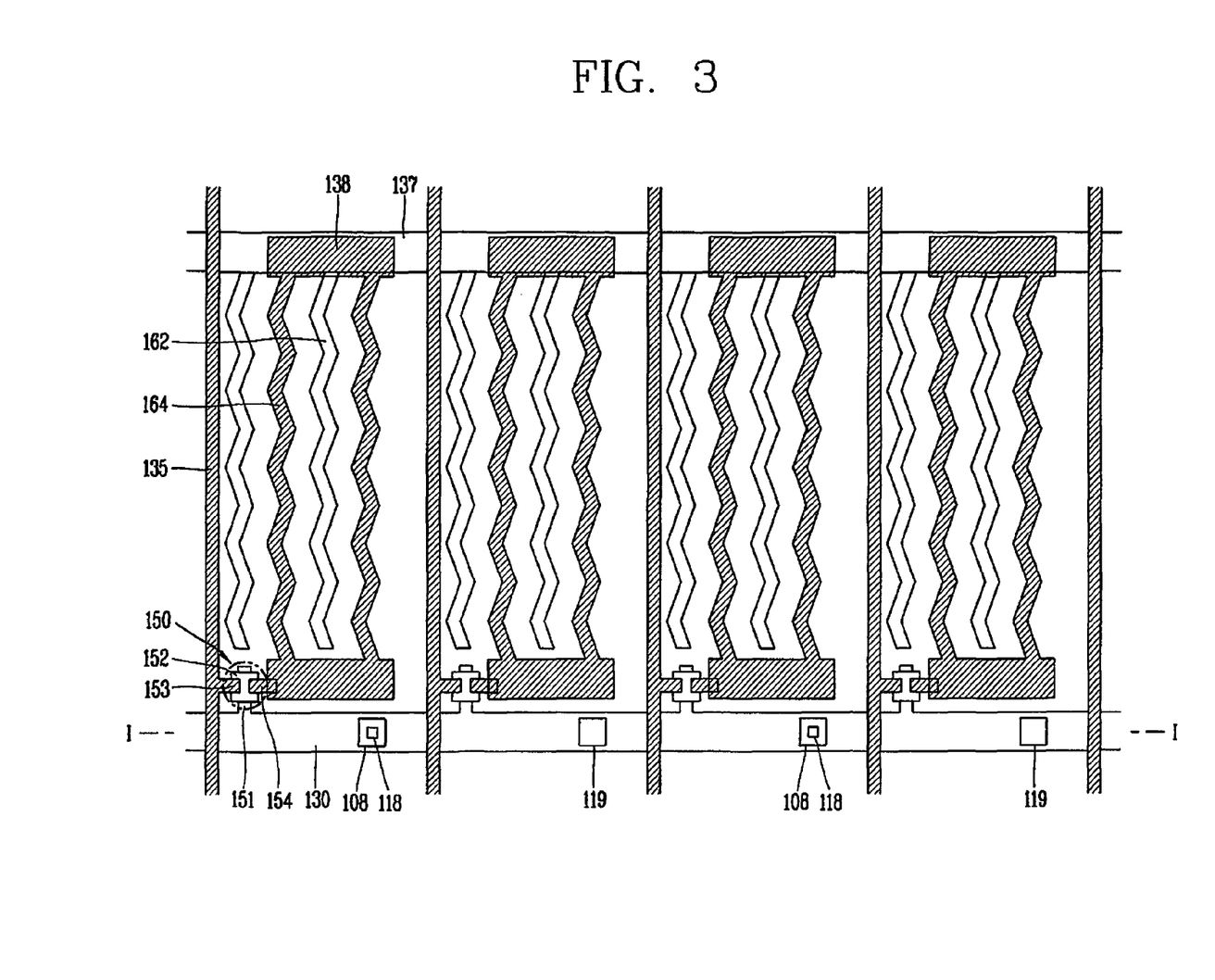
FIG. 3 is a plan view illustrating an LCD panel according to the invention.

FIG. 3 is a plan view of a liquid crystal display device having the column spacers 108 and 109 of this invention. Although an in-plane switching mode liquid crystal display device is shown in figure as one example of the invention, other types liquid crystal display devices such as a Twisted Nematic mode and a Vertical Alignment mode liquid crystal display device, and the like, may be adapted to the invention.

As shown in the illustrated embodiment of FIG. 3, the liquid crystal display device includes a plurality of pixels defined by a plurality of gate lines 130 and data lines 135 and a thin film transistor 150 is disposed at each pixel.

The thin film transistor 150 includes a gate electrode 151 connected to the gate line 130 to which a scan signal is applied, a semiconductor layer 152 on the gate electrode 130 to be activated by the scan signal applied to the gate electrode 130 to form a channel layer, and a source and drain electrodes 153 and 154 on the semiconductor layer 152 to transmit the image signal from the data line 135 to the pixel.

At least one common electrode 162 and pixel electrode 164 are parallel disposed in the pixel to generate an electric field parallel to the surface of the substrate. A common line 137 connected to the common electrode 162 and a pixel electrode line 138 connected to the pixel electrode 164 are disposed in the pixel. The common line 137 and the pixel electrode line 138 overlap to generate a storage capacitance.

A plurality of column spacers 108 and 109 are formed over the gate line 130. Although only one column spacer is formed in each pixel in FIG. 3, alternatively two column spacers may be formed in each pixel or only one column spacer may be formed in at least two pixels.

The protrusions 118 are formed over the gate line 130 to be contact with the first column spacers 108 in order to maintain the constant cell gap. Although only one protrusion 118 is disposed in every two pixels in FIG. 3, alternatively one protrusion 118 may be disposed in each pixel or at least two protrusions 118 may be formed in each pixel.

The combination of the first column spacers 108 and the protrusions 118 act as the gap spacer and the second column spacers 109 which is not contacted with the protrusions 118 acts as pressure spacers.

In one aspect of the illustrated embodiment, the gap spacers and the pressure spacers are alternatively disposed in the pixels. In the illustrated embodiment, the gap spacers and the pressure spacers are distributed in the whole area of the substrates 103 and 105 to maintain the constant cell gap and to prevent the touch inferiority and the press inferiority.

Although the column spacers 108 and 109 and the protrusions 118 are formed over the gate line 130 in FIG. 3, alternatively the column spacers 108 and 109 and the protrusions 118 may be formed over the data line 135 or in the cross region of the gate line 130 and the data line 135.

Figure 4A:
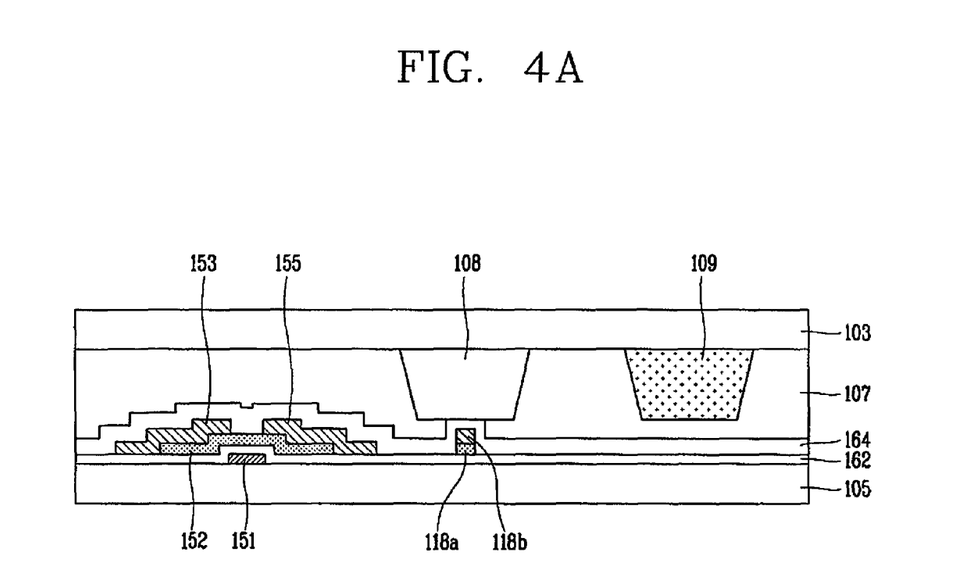
FIGS. 4A and 4B are partial sectional views along line I-I' of FIG. 3.
Figure 4B:
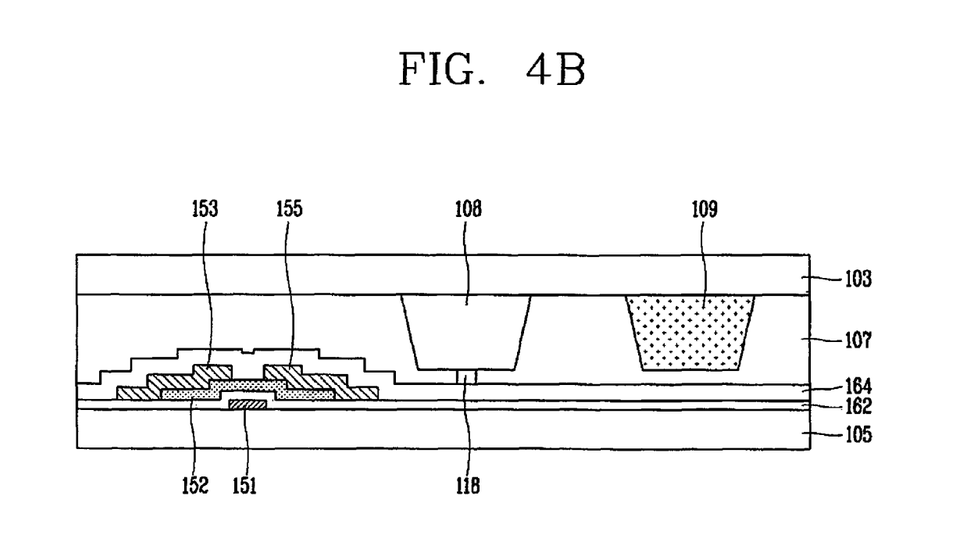

FIGS. 4A and 4B are sectional views along the I-I' line of FIG. 3 illustrating the structure of the column spacers 108 and 109 and the protrusions 118 of the LCD panel according to the illustrated embodiment. The upper substrate is a color filter substrate having a color filter (not shown); the lower substrate is a TFT substrate having a plurality of TFTs. The illustrated TFT includes a gate electrode 151 on the lower substrate 105, a gate insulating layer 162 on the lower substrate 105, a semiconductor layer 152 on the insulation layer 162, and a source electrode 153 and a drain electrode 154 on the semiconductor layer 153. Further, the protrusion 118 includes a semiconductor layer 118A on the gate insulating layer 162 and a metal layer 118B on the semiconductor layer 118A. A passivation layer 164 is formed over the TFT and the protrusion 118.

The semiconductor layer 118A of the protrusion 118 may be formed by the same process as the semiconductor layer 152 of the TFT. The metal layer 118B may be formed by the same process as the source electrode 153 and the drain electrode 154 of the TFT. Though the semiconductor layer 118A and the metal layer 118B may be formed by different processes than the TFT, the protrusion 118 and the TFT may be formed by the same process. The protrusion 118 may be formed from semiconductor material or metallic material.

The first column spacers 108 and the second column spacers 109 are formed on the upper substrate 103. The first column spacers 108 and the second column spacers 109 are formed from organic material by common or separate processes.

As shown in FIG. 4B, the protrusion 118 may be formed on the passivation layer 164 of the lower substrate 105. The protrusion 118 may be formed from organic or metallic materials. The first column spacers 108 may directly contact the lower substrate 105 without the protrusion 118. In this case, the sectional area of the end portion contacting the lower substrate 105 may be reduced to decrease the frictional force between the surface of the lower substrate 105 and the first column spacers 108.

To simultaneously counteract touch inferiority and press inferiority in an LCD panel, an LCD panel may be configured so that the protrusions 118 are localized at different densities according to position on an LCD panel.

The degree of the touch inferiority and the press inferiority is different at the central region and the edge region of the LCD panel. The touch inferiority is maximum at the central region of the LCD panel and decreases toward to the edge region of the LCD panel. Thus, the number (or density) of the gap spacers causing the touch inferiority is highest at the central region and decreases toward to the central region from the edge region to minimize the touch inferiority.

Further, press inferiority is maximum at the central region of the LCD panel and decreases toward to the edge region of the LCD panel. Thus, the number (or density) of the pressure spacers to be contact with the substrates by the pressure inferiority is highest at the central region and decreases toward to the central region from the edge region to minimize the press inferiority.

As described above, the gap spacers and the press spacers are formed to have different density (or number) according to the position on the LCD panel and thereby the touch inferiority and the press inferiority may be prevented. Meanwhile, the gap spacer and the press spacer are defined by the protrusions 118. That is, the first column spacers 108 act as the gap spacer because they are contacting with protrusions 118 and the second column spacers 109 act as the press spacer because they are not contacted with the protrusions 118. Since the column spacers 108 and 109 are uniformly distributed in the LCD panel, the density (or number) of the gap spacer and the press spacer are dependent upon the density (or number) of the protrusion 118. In other word, the density (or number) of the protrusions 118 is decreased toward to the central region from the edge region and the density (or number) of the gap spacer is also decreased toward to the central region. Further, because there are fewer protrusions, the density (or number) of press spaces increases toward to the central region.

Figure 5A:
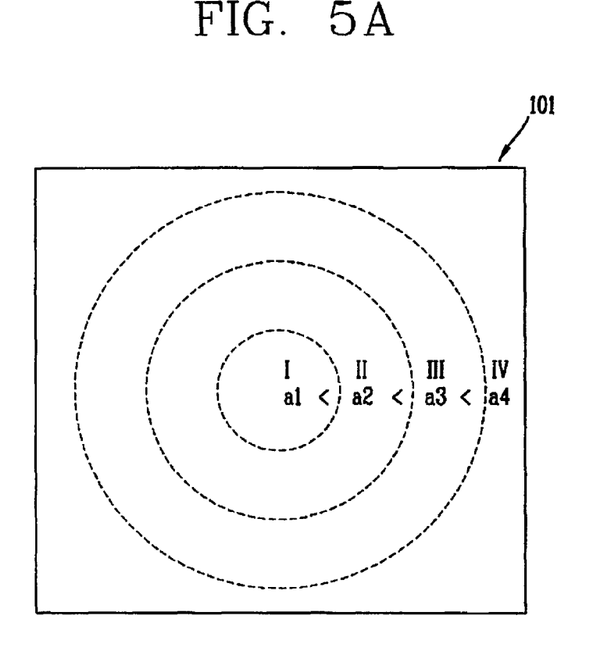
FIGS. 5A and 5B schematically illustrate density differences in gap spacer and pressure spacer localization according to position on an LCD panel.
Figure 5B:
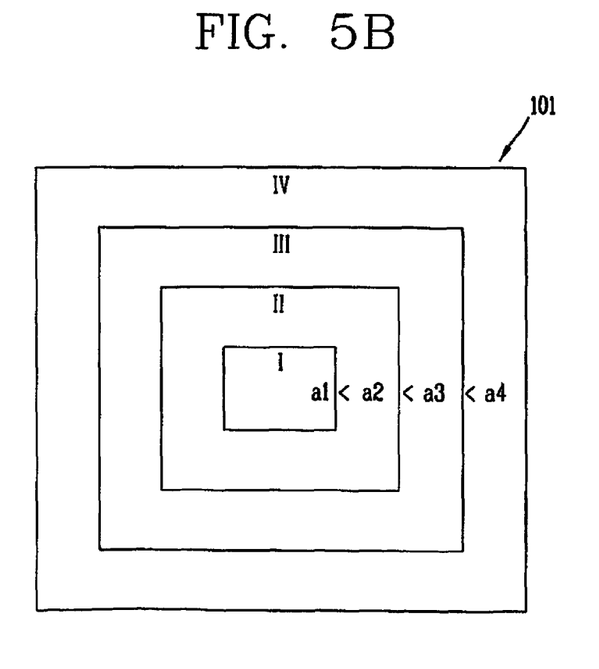

FIGS. 5A and 5B are views indicating conceptually the density of the protrusions 118. The protrusions 118 are positioned at higher spatial densities "a" at the edge region and at decreasing spatial densities near the central region of the LCD panel as shown in FIGS. 5A and 5B (namely, a1<a2<a3<a4, here, each of a1, a2, a3 and a4 denotes a protrusion density at regions I, II, III and IV divided in the LCD panel). The density regions may be defined by circular or square shapes as shown in FIGS. 5A and 5B, respectively. Selection of the square or circular shapes may depend on the size of a fabricated LCD panel 101 or an aspect ratio. The density regions of the LCD panel 101 need not be limited to four regions, however; instead, they may be divided by essentially any plurality of density regions.

By configuring the LCD panel to have different distributions of the protrusions 118 depending on LCD panel location to have different distributions of the gap spacers and the pressure spacers, it is possible to simultaneously reduce both touch inferiority and press inferiority in an LCD panel.

The density of the protrusions 118 may be increasing in various configurations toward the edge region from the central region of the LCD panel. For example, the density of the protrusions 118 may be linearly or non-linearly varied.

The variation of the density of the protrusions 118 in the LCD panel means a variation of the number of the protrusions 118 and a variation of the distance between the neighboring protrusions 118. That is, the increase in density of the protrusions 118 at the edge region of the LCD panel means an increase in the number of the protrusions 118 and decrease in the distance between the neighboring protrusions at the corresponding region. Further, the decrease of density of the protrusions 118 at the central region of the LCD panel means a decrease in the number of the protrusions 118 and an increase in the distance between the neighboring protrusions at the corresponding region.

Figure 6A:
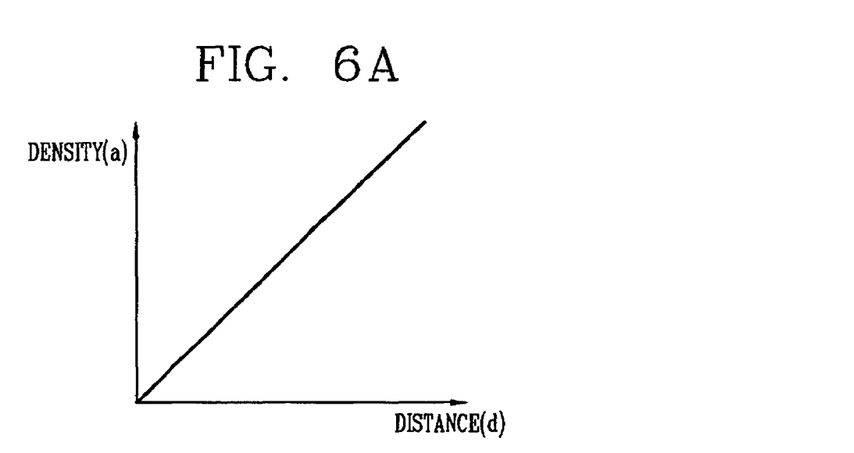
FIGS. 6A-6C are graphs illustrating the density of the protrusions in the LCD panel according to the present invention.
Figure 6B:
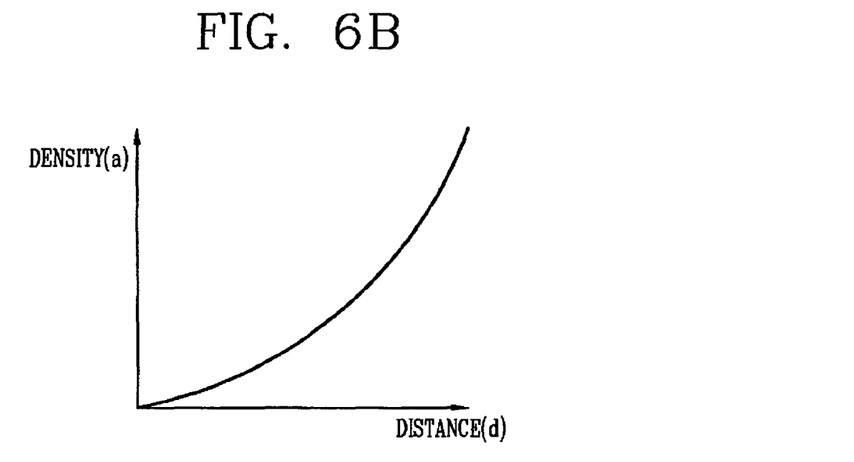
Figure 6C:
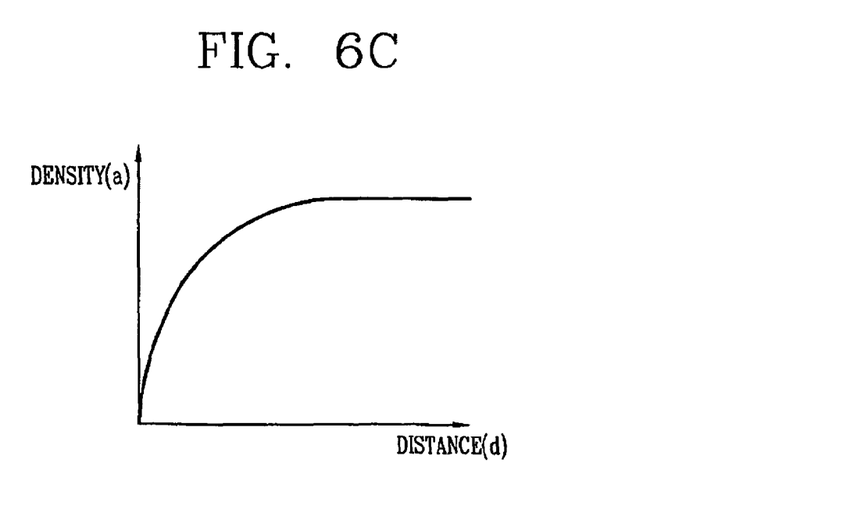
Figure 7A:
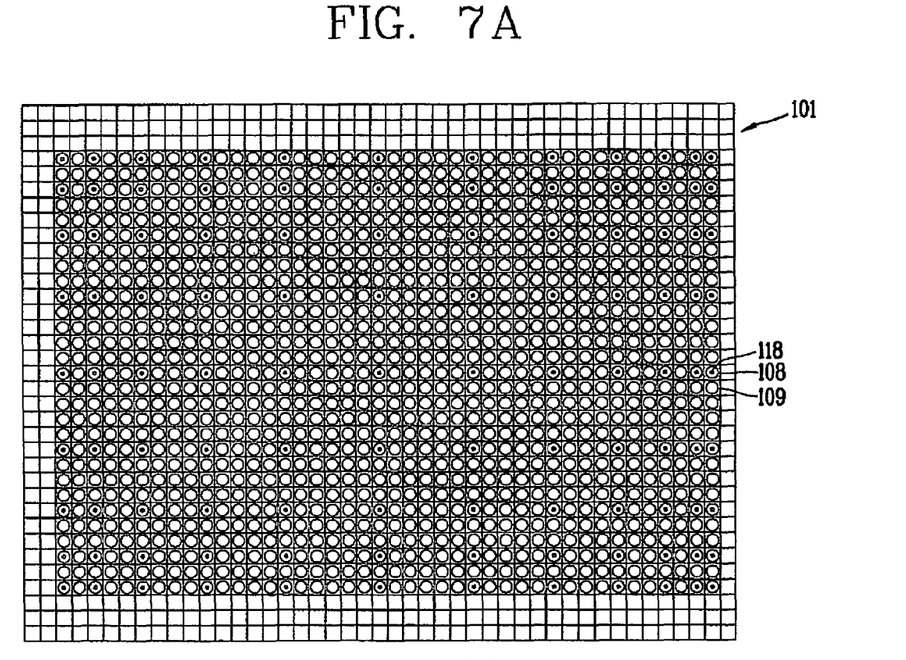
FIGS. 7A-7C are views illustrating the LCD panel having the protrusions and the column spacers according to the present invention.
Figure 7B:
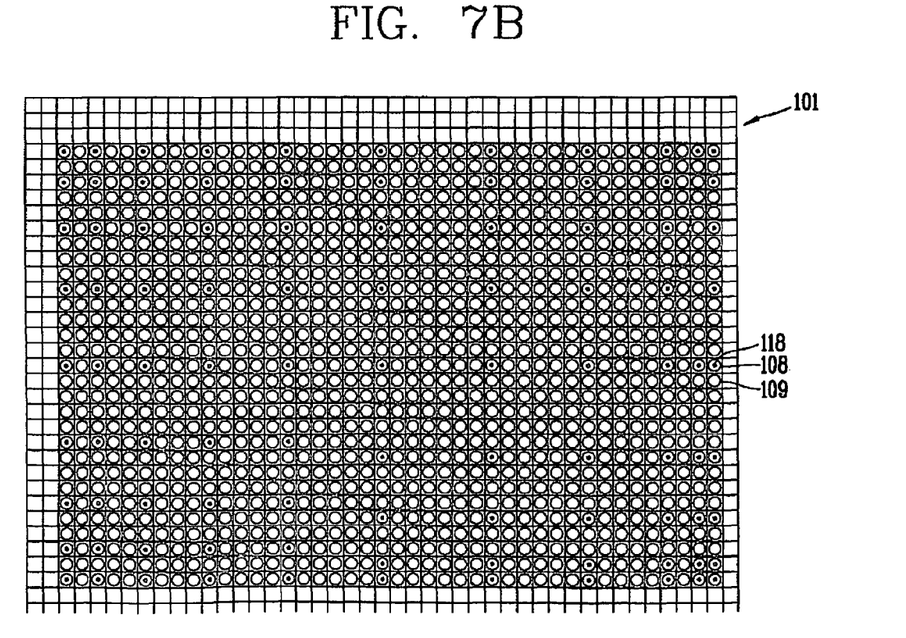
Figure 7C:
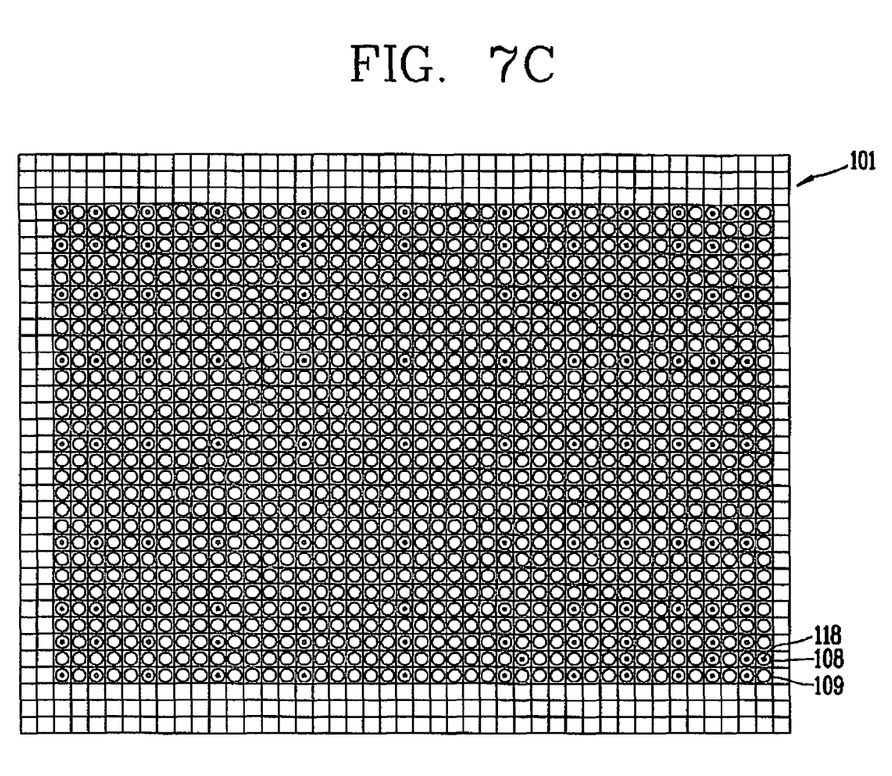

FIGS. 6A-6C are graphs illustrating the density of the protrusions 118 in an LCD panel arranged in accordance with an embodiment of the invention and FIGS. 7A-7C are views illustrating an LCD panel having the protrusions 118 and the column spacers 108 and 109. For purposes of illustration, since the figures are drawn to describe conceptually the invention, only the pixels are drawn without the detail structure of the LCD panel. That is, the figures includes only the pixels arranged in the vertical and horizontal directions and the protrusions and the column spacers therein without the detailed structure.

Though not shown in the figures, the LCD panel of this invention includes IPS mode, TN mode, and VA mode LCD panels. Further, though the column spacers 108 and 109 and the protrusions 118 are disposed within the pixels in figures, the column spacers 108 and 109 and the protrusions 118 can be disposed over the gate line, over the data line, and at the cross region of the gate line and the data line.

As shown in FIG. 6A, the density of the protrusions 118 may be linearly increased toward the edge region from the central region of the LCD panel (where the origin represents the center of the LCD panel). Accordingly, the density of the protrusions 118 is linearly increased, as the distance d from the central region is increased. The linear variation of the density of the protrusions 118 is shown in FIG. 7A. In FIG. 7A, the column spacers 108 and 109 are disposed in each pixel and the protrusions 118 are disposed in predetermined pixels to form the gap spacers. In this case, the distance between the neighboring protrusions 118 is linearly decreased and the number of the protrusions 118 is linearly increased toward to the edge region from the central region.

Since the protrusions 118 are contacted with the first column spacers 108 to form the gap spacer, in the aspect of the gap spacer, the density of the gap spacers may be linearly increased toward to the edge region from the central region of the LCD panel.

As shown in FIG. 6B, in this invention the density of the protrusions 118 of this invention may exponentially increase toward the edge region from the central region of the LCD panel. The density of the protrusions 118 is exponentially increased, as the distance d from the central region is increased. As shown in FIG. 7B, the distance between the neighboring protrusions 118 is exponentially decreased and the number of the protrusions 118 is exponentially increased toward to the edge region from the central region.

As shown in FIG. 6C, in a further aspect of the invention the density of the protrusions 118 may logarithmically increase toward the edge region from the central region of the LCD panel. The density of the protrusions 118 is logarithmically increased, as the distance d from the central region is increased. As shown in FIG. 7C, the distance between the neighboring protrusions 118 is logarithmically decreased and the number of the protrusions 118 is logarithmically increased toward to the edge region from the central region.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, changes and modifications that fall within the metes and bounds of the claims, or equivalents thereof are intended to be embraced by the appended claims.

What is claimed is:

1. A liquid crystal display device comprising;
    first and second substrates;
    a liquid crystal layer between the first and second substrates;
    column spacers between the first and second substrates to maintain a cell gap; and
    protrusions contacting corresponding column spacers, wherein a spatial number density of the protrusions varies at different positions across the first or second substrates.

2. The device of claim 1 further comprising: gate lines and data lines on the second substrate defining a plurality of pixels; and a thin film transistor in each pixel.

3. The device of claim 2, wherein the thin film transistor includes:
    a gate electrode on the second substrate;
    a gate insulating layer on the gate electrode;
    a semiconductor layer on the insulating layer;
    a source electrode and a drain electrode on the semiconductor layer; and
    a passivation layer over the second substrate.

4. The device of claim 2, wherein at least one column spacer is over the gate line.

5. The device of claim 2, wherein at least one column spacer is over on a the data line.

6. The device of claim 1, wherein at least one of the column spacers comprises an organic material.

7. The device of claim 1, wherein at least one of the protrusions comprises an end portion configured to contact the corresponding column spacer disposed on the opposing substrate.

8. The device of claim 1, wherein the at least one protrusion is disposed on the second substrate and the column spacer is disposed on the first substrate.

9. The device of claim 7, wherein the area of the end portion of the protrusions is smaller than the area of the corresponding column spacer contacting the opposing substrate.

10. The device of claim 9, wherein the area of the corresponding column spacer is 1.5 to 2.5 times larger than the end portion of the protrusions.

11. The device of claim 3, wherein the protrusions comprise: a semiconductor layer on the gate insulating layer; and a metal layer on the semiconductor layer.

12. The device of claim 10, wherein the protrusion includes a metal layer on the passivation layer.

13. The device of claim 1, wherein at least one of the column spacers resides on the first substrate and is spaced from the second substrate by a predetermined distance.

14. The device of claim 1, wherein the spatial number density of protrusions in a center portion of the substrates is lower than in an outer periphery portion of the substrates.

15. The device of claim 1, wherein the spatial number density of the protrusions linearly decreases in a direction from a peripheral portion toward a center portion of the first and second substrates.

16. The device of claim 1, wherein the liquid crystal display device comprises one of an In Plane Switching (IPS) mode device, Twisted Nematic (TN) mode device, or a Vertical Alignment (VA) mode device.

17. A liquid crystal display device comprising:
first column spacers contacting first and second substrates; and
second column spacers on one of the first and second substrates and spaced apart from the other of the first and second substrates, wherein a spatial number density of the first column spacers varies across the first and second substrates, such that the spatial number density in a center portion is less than an outer periphery portion.

18. The device of claim 17, wherein the first column spacers comprise a protrusion in contact with a gap spacer.

19. The device of claim 18, wherein the protrusion comprises another gap spacer.

20. The device of claim 18, wherein the protrusion comprises an end portion configured to contact the gap spacer.

21. The device of claim 18, wherein the area of an end portion of the protrusion is smaller than the area of the gap spacer in contact with the protrusion.

22. The device of claim 21, wherein the area of the gap spacer in contact with the protrusion is 1.5 to 2.5 times larger than the end portion of the protrusion.

23. The device of claim 21, wherein the area of the gap spacer in contact with the protrusion is equal to the area of the end portion of the protrusion.

24. The device of claim 18, wherein the gap spacer comprises a structure having a flat surface.

25. The device of claim 24, wherein the area of an end portion of the protrusion is smaller than the area of the flat surface of the gap spacer.

26. The device of claim 18, wherein the gap spacer comprises a structure having a round surface.

27. A liquid crystal display device comprising:
first and second substrates;
a plurality of pixels in the first and second substrates;
a plurality of first column spacers on the second substrate, the first column spacers contacting first and second substrates;
a plurality of second column spacers second substrates; and
a plurality of protrusion on the first substrate, the protrusions being contacted with the second column spacers;
wherein the number of the protrusions in the plurality of pixels varies across the first and second substrates, such that the number of protrusions in the pixels in a center portion of the display is less than the number of protrusions in the pixels in a periphery portion.

28. The device of claim 27, wherein the number of the protrusions in the plurality of pixels exponentially varies across the first and second substrates.

29. The device of claim 27, wherein the number of the protrusions in the plurality of pixels logarithmically varies across the first and second substrates.

30. A liquid crystal display device comprising;
first and second substrates;
a liquid crystal layer between the first and second substrates;
column spacers on the second substrate to maintain a cell gap between the first and second substrates; and
protrusions on the first substrate, the protrusions contacting a part of the column spacers,
wherein the distance between the protrusions increases in a direction from a periphery of the display toward a center of the first or second substrates.

31. The device of claim 30, wherein the distance between the protrusions linearly increases in a direction from a periphery of the display toward a center of the first or second substrates.

32. The device of claim 30, wherein the distance between the protrusions exponentially increases in a direction from a periphery of the display toward a center of the first or second substrates.

33. The device of claim 30, wherein the distance between the protrusions logarithmically increases in a direction from a periphery of the display toward a center of the first or second substrates.

34. A method for making a liquid crystal display device comprising:
forming first and second substrates;
forming column spacers between the first and second substrates to maintain a cell gap;
forming protrusions contacting corresponding column spacers,
wherein a spatial number density of the protrusions varies at different positions across the first or second substrates; and disposing a liquid crystal layer between the first and second substrates.

35. The method of claim 34 further comprising:
forming gate lines, data lines and pixels on the second substrate; and
forming thin film transistors in the pixels, wherein a plurality of the thin film transistors are formed by a process comprising: forming a gate electrode on the second substrate; forming a gate insulating electrode on the gate electrode; forming a semiconductor layer on the insulating layer; forming a source electrode and a drain electrode on the semiconductor layer; and forming a passivation layer over the second substrate.

36. The method of claim 35 further comprising forming at least one protrusion on at least one of a gate line or a data line.

37. The method of claim 35 forming protrusions comprises forming at least one protrusion on the second substrate, wherein the area of the end portion of the protrusions is smaller than the area of the corresponding column spacer contacting the opposing substrate.

38. The method of claim 35, wherein at least on of the column spacers on the first or second substrate are formed to be spaced at a predetermined distance from the opposing substrate.

39. The method of claim 35 wherein the protrusions are formed so that the spatial number density of protrusions in a center portion of the substrates is lower than in an outer periphery portion of the substrates.

40. The method of claim 35, wherein forming protrusions comprises forming a semiconductor layer on the gate insulating layer and disposing a metal layer on the semiconductor layer.

41. The method of claim 40, wherein forming protrusions comprises forming a metal layer on the passivation layer.

* * * * *